(12) United States Patent
Chen

(10) Patent No.: US 6,648,505 B1
(45) Date of Patent: Nov. 18, 2003

(54) STRUCTURE FOR VEHICULAR TEMPERATURE, AIR PRESSURE AND VACUUM METER

(75) Inventor: Duke Chen, Taipei (TW)

(73) Assignee: Equus Inc., Taipei (TW)

( * ) Notice: Subject to any disclaimer, the term of this patent is extended or adjusted under 35 U.S.C. 154(b) by 0 days.

(21) Appl. No.: 10/261,934

(22) Filed: Oct. 2, 2002

(51) Int. Cl.[7] .................................................. G01K 1/08
(52) U.S. Cl. ...................... 374/143; 374/203; 374/208; 73/732; 116/220; 116/305
(58) Field of Search .................. 374/203, 201, 374/208, 210, 141, 142, 143; 73/732; 116/284, 305, 216, 220

(56) References Cited

U.S. PATENT DOCUMENTS 1,904,492 A * 4/1933 Manuel ........................ 73/732
1,937,888 A * 12/1933 Harada ........................ 73/732
5,304,004 A * 4/1994 Nunes ........................ 374/208
5,481,921 A * 1/1996 Carpenter et al. ............ 73/732

* cited by examiner

Primary Examiner—Andrew H. Hirshfeld
Assistant Examiner—Stanley J. Pruchnic, Jr.
(74) Attorney, Agent, or Firm—Bacon & Thomas, PLLC

(57) ABSTRACT

This invention relates to an improved structure for the vehicular temperature, pressure and vacuum meters with characteristics on that the hand rod is an integrally formed design joined to the dial plate and Bourdon tube without using any bolts or screws, so it is convenient for fast assembly. The Bourdon tube and the hand rod are designed to be suitable for application of any size of the dial plate, so the Bourdon tube, the hand rod and the dial plate can be manufactured and assembled in mass production and tested beforehand to assure the required sensitivity and accuracy as long as the retaining recess on the dial plate can be fitted and locked firmly in place with the retaining protruding point on the meter housing.

1 Claim, 4 Drawing Sheets

STRUCTURE FOR VEHICULAR TEMPERATURE, AIR PRESSURE AND VACUUM METER

FIELD OF THE INVENTION

This invention relates to an improved structure of a vehicular temperature, pressure and vacuum meter which mainly comprises a meter body, a Bourdon tube, a fast-removable hand rod and a dial plate, in particular, the dial plate, the Bourdon tube and the fast-removable hand rod can be assembled without using any bolts and screws. Besides, before mass production, manufacture and assemblage, it is not necessary to consider the specification requirements for the sizes of the dial plates, while the test of sensitivity and accuracy of the Bourdon tube corresponding to the indication hand of the fast-removable hand rod can be completed at the same time, thus the retaining recess on the dial plate is fitted perfectly in place to the retaining protruding point on the housing.

BACKGROUND OF THE INVENTION

In most cases, the temperature, pressure and vacuum meter takes the advantage of the Bourdon tube for detecting variation of temperature, air pressure or vacuum under a certain working condition to ensure the mechanical safety in vehicles. That is, when the circular copper tube fixed on the housing senses the changes of working environment, the expansion and contraction thus generated will drive the driving mechanism, and move the indication hand to display the resultant changes in temperature, pneumatic pressure, hydraulic pressure and vacuum physically taking place in this working environment.

As shown in FIG. 4, the components of the prior art of temperature, pressure or vacuum meter include the housing 14, the Bourdon tube 4, indication hand 5, and the dial plate 2, wherein the Bourdon tube 4 has a bracket 41, a circular copper tube 42, a drive mechanism 43, a vent tube 45 and connecting rack 47. The top of the bracket 41 is welded to the vent tube 45 and the circular copper tube 42, and one end of circular copper tube 42 is welded to the drive mechanism 43 to form an integral part. The drive mechanism 43 is long bent copper wire with one end bent into clevis bolted to the connector 46 on the back of the dial plate 2. By means of the screw hole 48 on the connecting rack 47, the dial plate 2 is fixed to the completed Bourdon tube 4 and the indication hand 5 is welded to the connector 46. As a matter of fact, the prior art of the temperature, pressure and vacuum meter is not an ideal design, which brings forth many problems in the production line as described below:

1. Multiplicity in components and complicity in assembly for the Bourdon tube leads to high production cost.

In the assembly process, it takes welding and bolting operation to put the Bourdon tube, the dial plate and the hand rod via the connector and the connecting rack. Such a process implies directly the laborious complicity in assembly, and indirectly the higher production cost. The fast-removable hand rod is an integral form, easy and swift to be assembled to the Bourdon tube and the dial plate. The problem occurred in the prior art will never happen in this invention.

2. The Bourdon tube and the hand rod can never be assembled, adjusted and tested beforehand.

In manufacturing the prior art of the temperature, pressure and vacuum meter, the hand rod has to pass an aperture on the dial plate to be welded to the Bourdon tube and finally to be test for its sensitivity and accuracy. In particular, the dial plate varies in size and color, so it is impossible to shorten the production time and reduce the production cost because these three components are not allowed to be assembled beforehand. This invention proposes an integrally designed fast-removable hand rod, so the difficulties encountered in the prior art are eliminated. The assemblage, production as well as the adjustment of sensitivity and accuracy of the Bourdon tube corresponding to the fast-removable hand rod can be proceeded without regard to the size and color of the dial plate.

To this end, the inventor has spent for years the efforts to seeking better solution to come up with an improved structure for the vehicular temperature, pressure and vacuum meter having high value and novel characteristics.

SUMMARY OF THE INVENTION

The main object of this invention is to provide an improved structure for the vehicular temperature, pressure and vacuum meter equipped with a unique dial plate, irrespective of size and color. This design permits fast assembly, manufacture and test beforehand for its sensitivity and accuracy.

Another object of this invention is to provide a substantially simplified procedure for assembly and manufacture of the vehicular temperature, pressure and vacuum meter in which the hand shaft of the integrally formed hand rod is inset to the aperture of the bracket of the Bourdon tube and the dial plate is infixed to the housing with no welding and bolting process.

Another object of this invention is to provide an integrally formed hand rod, saving the cost of the connector, connecting rack, screw and bolt.

Many changes and modifications in the above disclosed embodiment of the invention can, of course, be carried out without departing from the scope thereof. Accordingly, to promote the progress in science and the useful arts, the invention is disclosed and is intended to be limited only by the scope of the appended claims.

DETAILED DESCRIPTION OF THE INVENTION

Figure 1:
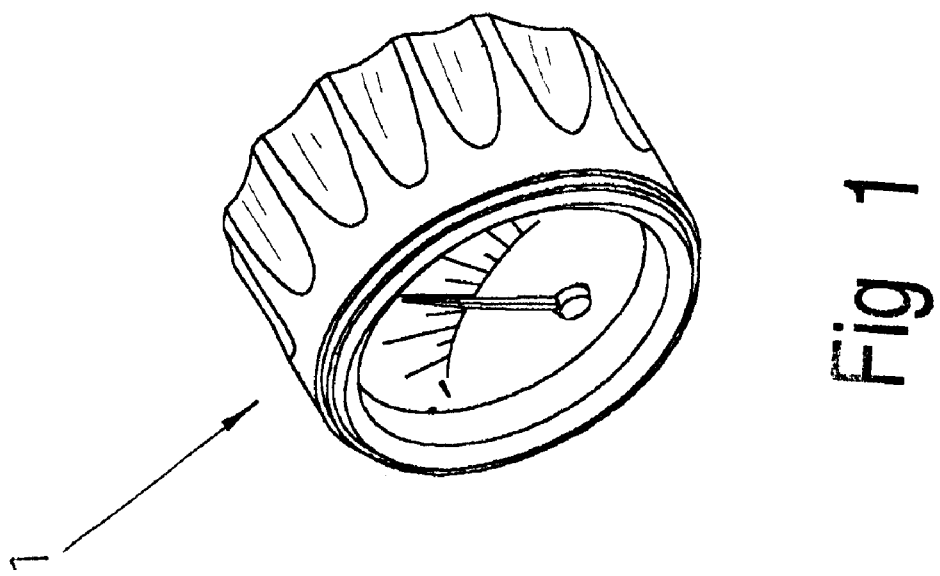
FIG. 1 shows a stereo outlook of the improved meter of this invention.
Figure 2:
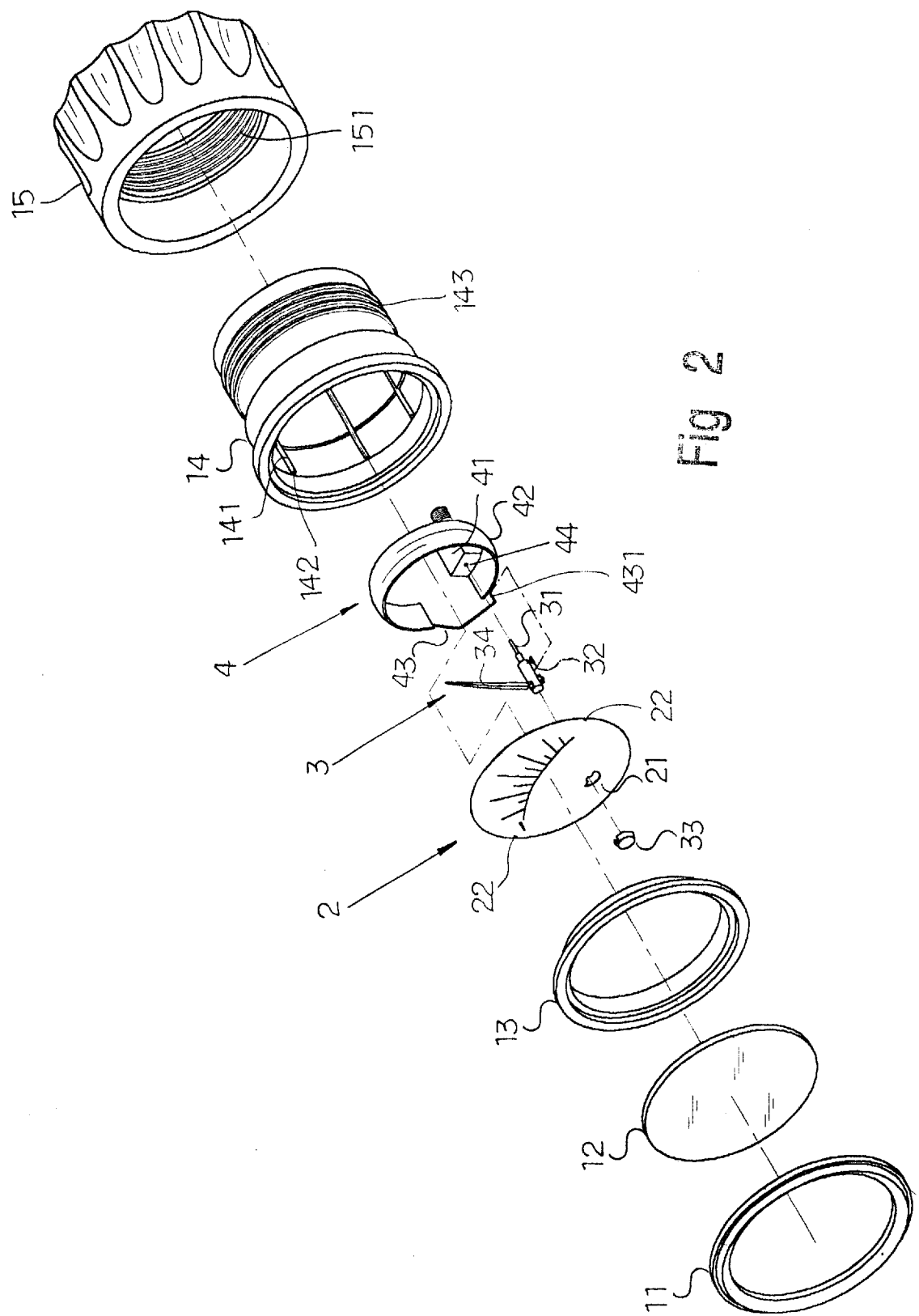
FIG. 2 shows a disassembly of the improved meter of this invention.
Figure 3:
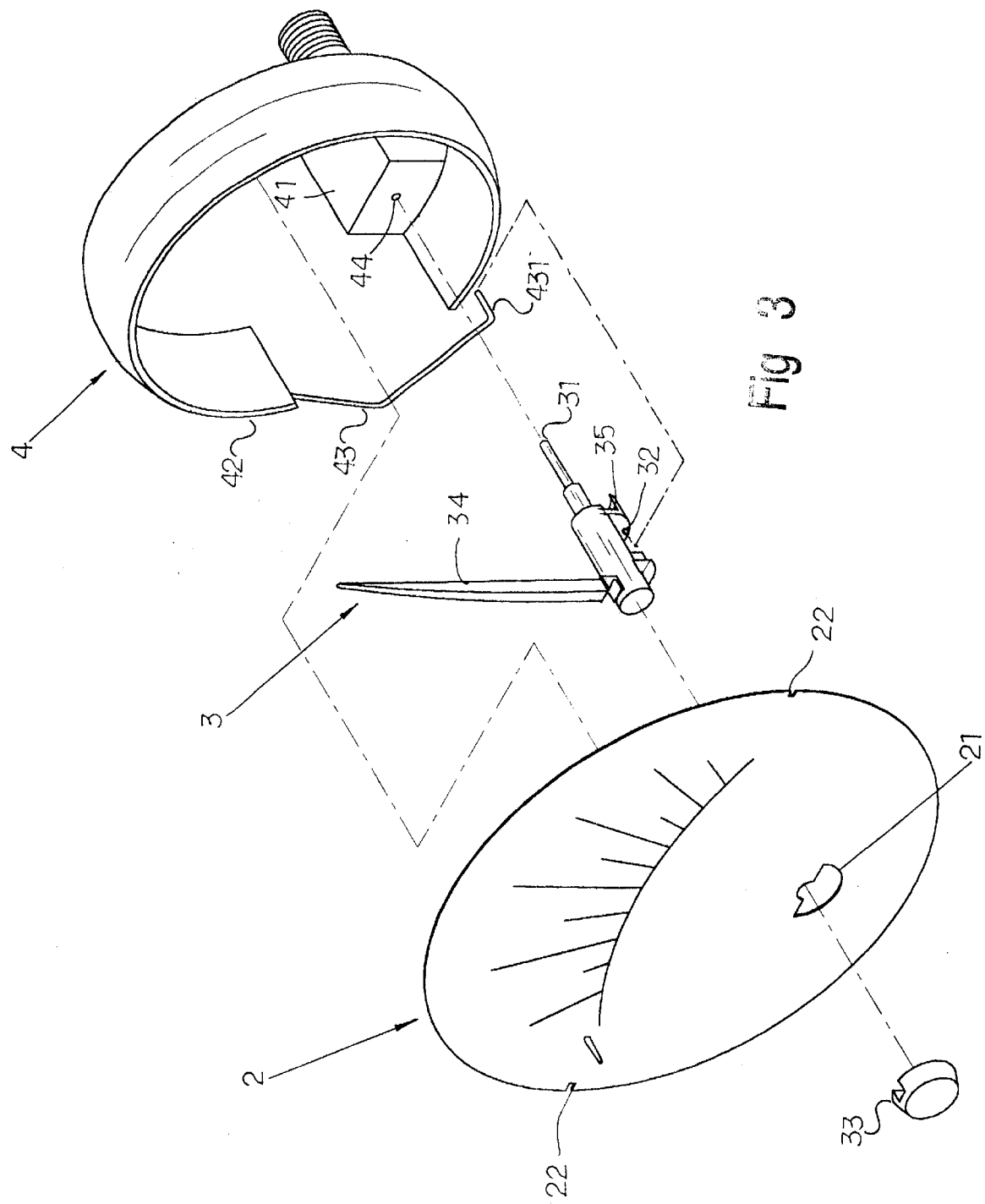
FIG. 3 shows a partial sectional disassembly of improved meter of this invention.
Figure 4:
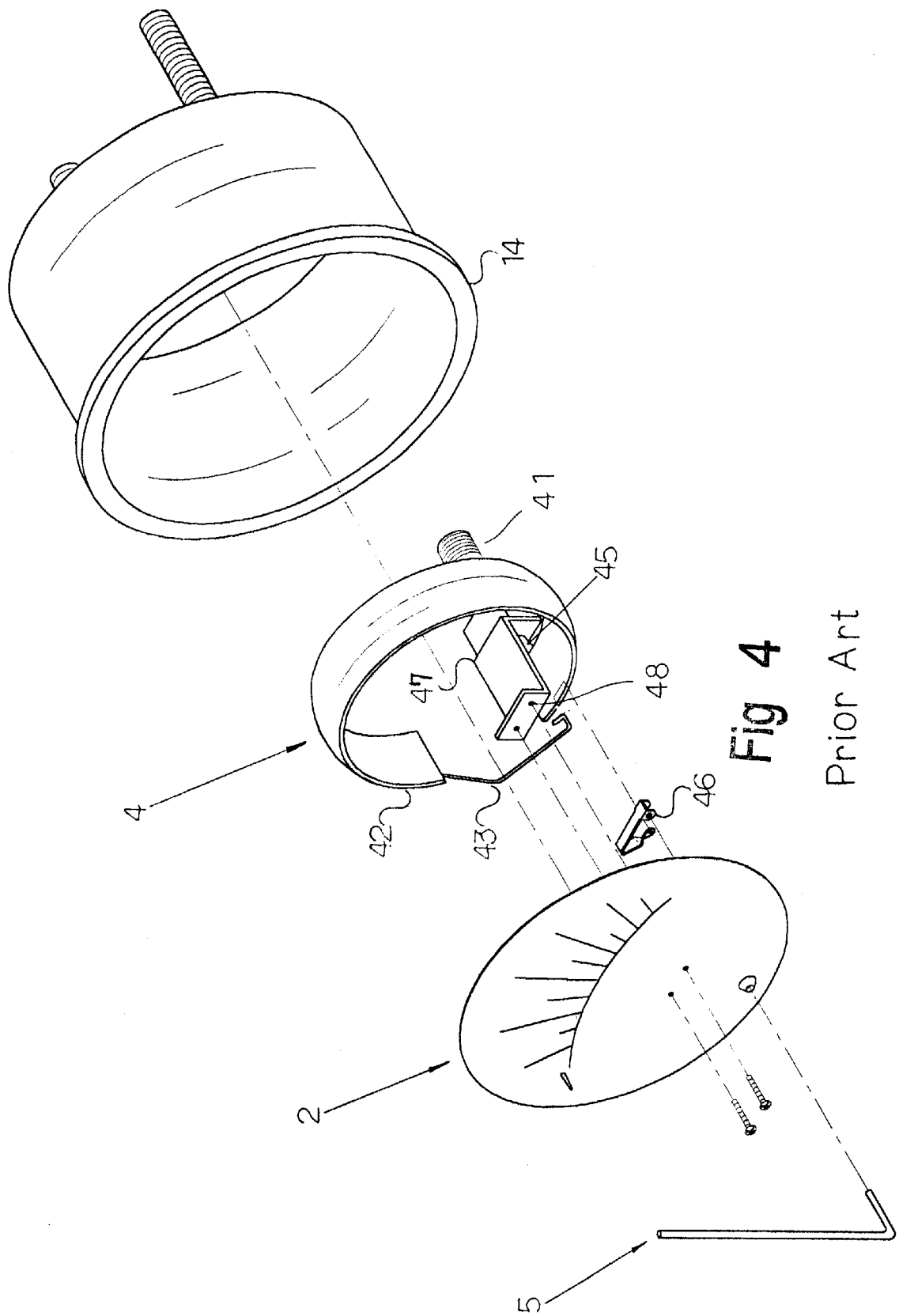
FIG. 4 shows a prior art of the vehicular meter.

As shown in FIGS. 1 through 3, the improved structure for a vehicular temperature, pressure and vacuum meter mainly comprises a meter body 1, a Bourdon tube 4, a fast-removable hand rod 3 and a dial plate 2, wherein:

The meter body 1 contains a metal ring 11, a pane 12, a front ring 13, a housing 14 and a casing 15. The housing 14 has a plurality of upright fix bar 141 spaced in equidistance on the inner wall, on the upper top of each pair of fix bar 141, there builds a retaining protruding point 142 which is to fit the retaining recess 22 of the dial plate 2. The housing 14 has the male thread 143 to-be screwed in the female thread 151 on the casing 15.

The Bourdon tube 4 consists of a bracket 41, a circular copper tube 42, and a drive mechanism 43. The bracket 41 is a metal rectangle having an aperture 44 on the top end to receive the hand shaft 31 of the fast-removable hand rod 3. The circular copper tube 42 is welded to one side of the bracket 41. The other end of the bracket 41 forms a cylindrical hollow center with male thread on the inner wall worked as vent. The other end of the circular copper tube 42 is welded to the tube end of the drive mechanism 43. The drive mechanism 43 is a long wire inherent with super expansion and contraction co-efficiency and bent in adequate angle. Another end of the drive mechanism 43 is also bent to become a pin 431 being inserted into the aperture 32 on the fast-removable hand rod 3.

A fast removable hand rod 3 forms an L type having a hand shaft 31, an indication hand 34 and a connecting bar 35. On the connecting bar 35, there is an aperture 32 to receive the pin 431 of the drive mechanism 43.

A dial plate 2 has the appearance of normal dials, wherein there is a semi-circular penetration 21 in the center for the fast-removable hand rod 3 to pass through and be locked by the hand cap 33, so the fast-removable hand rod 3 and hand cap 33 are fixed on the upper and lower sides of the dial plate 2, and two retaining recesses 22 are fixed on the right and left sides of the dial plate for the retaining protruding points 142 of the housing 14 to catch each other.

As shown in FIGS. 2 and 3, in the improved structure for the vehicular temperature, pressure and vacuum meter, it is every easy and simple to insert the hand shaft 31 of the fast-removable hand rod 3 into the aperture 44 of the Bourdon tube 4. When any change in temperature is detected by the Bourdon tube 4, the fast-removable hand rod 3 will rotate in response to this specific change. Because the pin 431 of the drive mechanism 43 is inset in the aperture 32 of the fast-removable hand rod 3, the semi-circular penetration 21 of the dial plate 2, the hand cap 33, the fast-removable hand rod 3 and the Bourdon tube 4 are integrated firmly. Finally screw the bracket 41 of the Bourdon tube 4 into the housing 14, place the front ring 13 on the top of the housing 14, the pane 12 on the front ring 13, the metal ring 11 riveted to the housing 14, and eventually tighten the housing 14 into the casing 15 to become a finished product.

After said meters are mounted on the dashboard of cars and linked in complete circuit, as soon as the circular copper tube 42 of the Bourdon tube 4 receives the signal of change in temperature, pressure and vacuum, it produces a proportional shrinkage which will affects the drive mechanism 43 to move the indication hand 34 of the fast-removable hand rod 3 to display the change of temperature, pressure and vacuum in the face of the driver.

The improvement of this invention presents the advantages in simplified structure and components, easy for production and saving in the production cost to the great extent. It has substantial application, justified for a grant of patent.

What is claimed is:

1. An improved structure for vehicular temperature, pressure and vacuum meter, mainly comprising a meter body, Bourdon tube, fast-removable hand rod and dial plate, characterized in that:

a housing of said meter body has a plurality of fix bars on an inner wall, and on top of each pair of said fix bars, there builds a retaining protruding point to be fitted into a retaining recess on said dial plate;

a Bourdon tube consists of a bracket, a circular copper tube and a drive mechanism, wherein said bracket is a metal rectangle having an aperture at one end to receive a hand shaft of said fast-removable hand rod;

a fast-removable hand rod in an L form consists of a hand shaft, an indication hand and a connector with an aperture to receive a pin of said drive mechanism;

a dial plate having semi-circular penetration in a center for said fast-removable hand rod to pass through and be locked by a hand cap, so said fast-removable hand rod and said hand cap are fixed on upper and lower sides of said dial plate, and two retaining recesses are fixed on right and left sides of said dial plate for retaining protruding points of said housing to catch each other;

with above-mentioned components, said dial plate, Bourdon tube and fast-removable hand rod can be assembled without using any bolts and screws, moreover, mass production and assemblage of said Bourdon tube and fast-removable hand rod can be proceeded as well as sensitivity and accuracy of said Bourdon tubes corresponding to said fast-removable hand rods can be tested before said Bourdon tube and fast-removable hand rod are assembled with said dial plate, thus a retaining recess on said dial plate is fitted perfectly in place to a retaining protruding point on said housing.

* * * * *